United States Patent
Asada (10) Patent No.: US 7,526,318 B2
(45) Date of Patent: Apr. 28, 2009

(54) MOBILE STATION INTERMITTENTLY RECEIVING A RADIO SIGNAL

(75) Inventor: Hideaki Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 362 days.

(21) Appl. No.: 10/932,391

(22) Filed: Sep. 2, 2004

(65) Prior Publication Data

US 2005/0192054 A1 Sep. 1, 2005

(30) Foreign Application Priority Data

Sep. 8, 2003 (JP) ............................. 2003-315335

(51) Int. Cl.
H04B 1/38 (2006.01)
(52) U.S. Cl. ...................... 455/558; 455/418; 455/411; 455/550.1; 455/95
(58) Field of Classification Search ................ 455/518, 455/558, 418, 411, 550.1, 95
See application file for complete search history.

(56) References Cited

U.S. PATENT DOCUMENTS

| | | | | |
|---|---|---|---|---|
| 4,679,244 A * | 7/1987 | Kawasaki et al. | ........... | 455/515 |
| 4,775,997 A * | 10/1988 | West et al. | ................... | 455/557 |
| 5,031,231 A * | 7/1991 | Miyazaki | .................... | 455/574 |
| 5,127,041 A * | 6/1992 | O'Sullivan | .................. | 455/557 |
| 5,687,216 A * | 11/1997 | Svensson | ................. | 455/412.2 |
| 5,920,269 A * | 7/1999 | Muramatsu | ................ | 340/7.35 |
| 6,597,895 B1 * | 7/2003 | Maeda | ........................ | 455/88 |
| 6,952,596 B2 * | 10/2005 | Dearn | ........................ | 455/558 |
| 7,126,924 B2 * | 10/2006 | Suzuki et al. | ................ | 370/311 |
| 7,136,645 B2 * | 11/2006 | Hanson et al. | ........... | 455/435.1 |
| 7,209,735 B2 * | 4/2007 | Sato | ........................... | 455/415 |
| 2001/0016502 A1* | 8/2001 | Shirai | ........................ | 455/558 |
| 2001/0034247 A1* | 10/2001 | Namiki | ...................... | 455/558 |
| 2003/0129964 A1* | 7/2003 | Kohinata et al. | ........... | 455/411 |
| 2003/0174839 A1* | 9/2003 | Yamagata et al. | .......... | 380/270 |
| 2004/0016814 A1* | 1/2004 | Muramatsu | ........... | 235/462.41 |
| 2004/0152438 A1* | 8/2004 | Yamauchi et al. | ........ | 455/343.1 |
| 2004/0176093 A1* | 9/2004 | Raval et al. | .................. | 455/436 |
| 2004/0179691 A1* | 9/2004 | Hori et al. | .................... | 380/277 |
| 2004/0235523 A1* | 11/2004 | Schrire et al. | ............... | 455/558 |
| 2005/0009543 A1* | 1/2005 | Huber | ........................ | 455/466 |
| 2005/0176465 A1* | 8/2005 | Fornell | ....................... | 455/558 |

FOREIGN PATENT DOCUMENTS

EP 0622 966 B1 * 7/2000

(Continued)

OTHER PUBLICATIONS

Chinese Office Action dated Feb. 16, 2007.

(Continued)

Primary Examiner—Duc Nguyen
Assistant Examiner—Amar Daglawi
(74) Attorney, Agent, or Firm—Scully, Scott, Murphy & Presser PC (57) ABSTRACT

A mobile station has a subscriber identity card (IC card 18) and operates for periodical detection of the IC card (18). The IC card detection is effected at the timing when a transceiver receives a signal from the base station for detecting an incoming call, if the signal reception is effected within a specified time interval from the previous IC card detection.

2 Claims, 6 Drawing Sheets

FOREIGN PATENT DOCUMENTS

| | | |
|---|---|---|
| EP | 0622966 | 7/2000 |
| GB | 2353672 | 2/2001 |
| JP | 06-296161 | 10/1994 |
| JP | 11-191797 | 7/1999 |
| JP | 2001-238260 | 8/2001 |

OTHER PUBLICATIONS

Translation of Chinese Office Action dated Feb. 16, 2007.
European Office Action, dated Sep. 13, 2007.

* cited by examiner

MOBILE STATION INTERMITTENTLY RECEIVING A RADIO SIGNAL

BACKGROUND OF THE INVENTION (a) Field of the Invention

The present invention relates to a mobile station intermittently receiving a signal and, more particularly, to a mobile station intermittently receiving a signal from a base station and periodically operating for a specific task.

(b) Description of the Related Art

A mobile station used in a GSM (global system for mobile communications) or IMT-2000 (international mobile telecommunications 2000) has a mobile terminal and an IC card inserted therein for storing information of the subscriber, such as a telecommunication number. In the GSM, for example, the IC card is generally called smart card or subscriber identity module (SIM) card.

Since the mobile station uses the information of the subscriber stored in the IC card for originating a call, the mobile station cannot successfully originate the call without the IC card. Thus, the mobile station inserting therein an IC card generally detects the presence/absence of the IC card (hereinafter referred to merely as "IC card detection") periodically at a specified interval in a waiting state of the mobile station. The technique for the IC card detection is described in JP-A-6-296161, -11-191797 and -2001-238260, for example.

The IC card detection is performed for the purpose of prohibiting the mobile station from originating a call without the IC card inserted therein. This purpose necessitates an early IC card detection in the mobile station after the IC card is removed therefrom. Thus, it is requested for the mobile station to periodically execute the IC card detection within a short time interval.

In the meanwhile, the mobile station intermittently operates for reception of a signal via a paging channel from the base station (hereinafter referred to merely as "signal reception") in the waiting state for the purpose of detecting an incoming call. This timing is performed in synchrony with the timing determined by the base station, and thus may be changed if the mobile station moves from a base station to another base station for an external handover.

Figure 7:
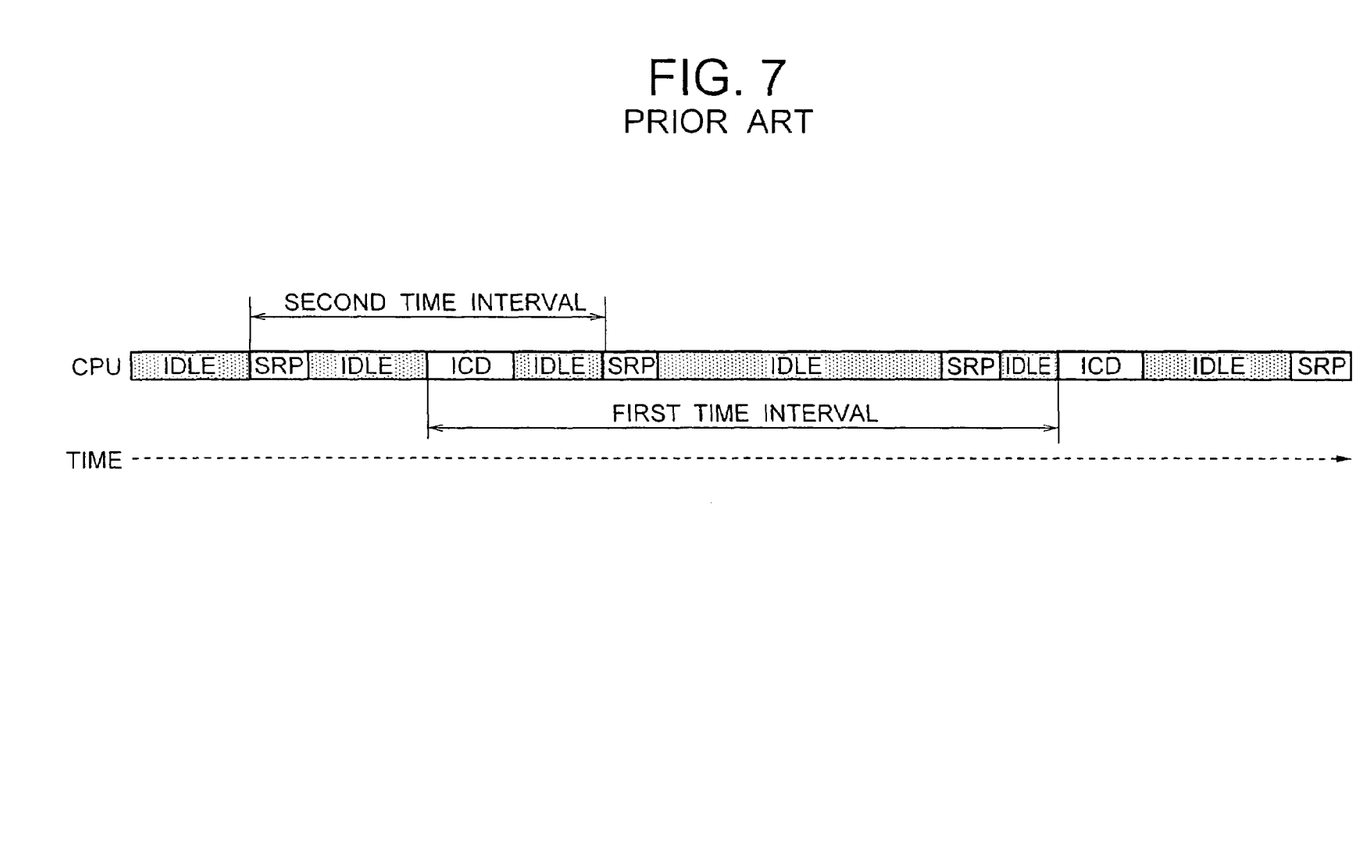
FIG. 7 is a timing chart of a conventional mobile station showing operation for the intermittent signal reception and the IC card detection.

FIG. 7 shows a timing chart showing the interval of the IC card detection (ICD) and the interval of signal reception processing (SRP) in a conventional mobile terminal. In FIG. 7, for example, the IC card detection (ICD) continues for around 30 to 40 milliseconds and the interval (first interval) of the IC card detection is around 30 seconds, whereas the signal reception processing (SRP) continues for around 20 to 100 milliseconds and the interval (second interval) of the signal reception processing is around 2 to 4 seconds. In other words, the IC card detection and the signal reception processing are performed in asynchronous operations. Thus, the CPU installed in the conventional mobile station manages the first interval and the second interval independently of each other.

If the mobile station stays in the waiting state for a specified time interval, the mobile station generally assumes a sleep mode (or idle mode) to thereby reduce the power dissipation. In such a circumstance, since the CPU manages the first interval and the second interval independently of each other to exit from the sleep mode into an active mode, a longer time length is needed for the mode shift, thereby increasing the power dissipation of the mobile station. In particular, since the clock signal stopped in the sleep mode must be generated in the active mode, the mode shift from the sleep mode to the active mode takes a longer time due to the necessity of assuring stabilization of the clock signal.

SUMMARY OF THE INVENTION

In view of the above problem in the conventional mobile station, it is an object of the present invention to provide a mobile station which is capable of reducing the power dissipation during operation for the IC card detection and signal reception.

The present invention provides a mobile station including: a signal receiving block for intermittently receiving a signal from a base station at a timing specified by the base station; a signal processing block for periodically operating a specific task within a time interval; a timer block starting for a time count at a specific timing to count up first and second time periods, wherein the timer block judges at a timing of a count up of the first time period in a first judgement whether or not the signal receiving block is receiving the signal, outputs a count up signal if the first judgement is affirmative, continues the time count until the timer block counts up the second time period or until the receiving block starts for receiving the signal if the first judgement is negative, and outputs a count up signal at a timing of a count up of the second time period or at a timing of the receiving block starting for receiving the signal; and a control block for responding to the count up signal to control the signal processing block so as to execute said specific task.

The present invention also provides a method including the steps of: starting for a time count at a specific timing to count up first and second time periods; judging at a timing of a count up of a first time period in a first judgement whether or not a signal reception is effected; outputting a count up signal if the first judgement is affirmative, continuing for the time count until the second time period expires or until a signal reception is started if the first judgement is negative, and outputting a count up signal at a timing of a count up of the second time period or at a timing of starting of the signal reception; and responding to the count up signal to operate a specific task, the specific task being a periodical task.

In accordance with the mobile station and method of the present invention, the specific task is executed substantially concurrently with the signal reception, to thereby reduce the frequency of the mode shift of the mobile station from the sleep mode to the active mode, thereby reducing the power dissipation thereof.

PREFERRED EMBODIMENT OF THE INVENTION

Now, the present invention is more specifically described with reference to accompanying drawings.

Figure 1:
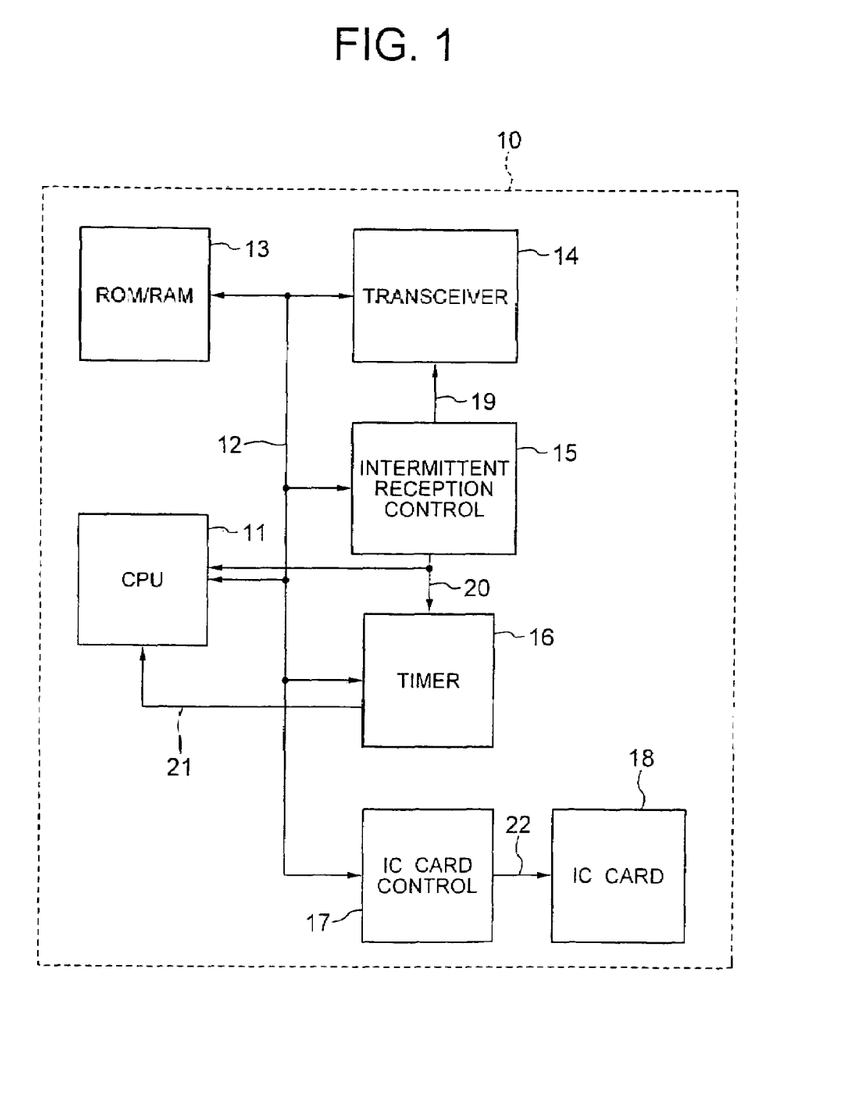
FIG. 1 is a block diagram of a mobile station according to an embodiment of the present invention.

Referring to FIG. 1, a mobile station, generally designated by numeral 10, according to an embodiment of the present invention includes a mobile terminal including a CPU 11, a ROM/RAM block 13, a transceiver block 14, an intermittent reception control block 15, a timer block 16, and an IC card control block 17, which are connected together via a bus line 12, and an IC card 18 inserted in the mobile terminal.

The transceiver block 14 transmits and receives signals to/from the base station (not shown) via a wireless link. The intermittent reception control block 15 detects the timing of the signal reception determined by the base station, and controls the transceiver block 14 via a control line 19 to operate for receiving a signal from the base station for the purpose of detecting an incoming call.

The timer block 16 counts specified time periods including first time period and second time period for determining the timing of the IC card detection. After the timer block 16 counts up the time period or time periods, the timer block 16 notifies the CPU 11 of the count up via an interrupt request line 21. The intermittent reception control block 15 notifies the CPU 11 of the timing of the signal reception from the base station via a control signal line 20. The control signal line 20 is also connected to the timer block 16.

The CPU 11 operates for signal processing during the signal reception, after being notified of the timing of the signal reception from the intermittent reception control block 15. The CPU 11 controls the IC card control block 17 to execute the IC card detection after being notified of the count up of the time period or periods by the timer block 16.

The timer block 16, after being set for the first and second time period, starts counting for the first time period, and judges whether or not the intermittent signal reception is effected, at the timing of the count up of the first time period. If it is judged at the count up of the first time period that the signal reception is being effected, then the timer block 16 immediately notifies the CPU 11 of the count up. On the other hand, if it is judged at the count up of the first time period that the signal reception is not being effected, then the timer block 16 continues to count for the second time period, as counted from the start of the count, without notifying the CPU 11 of the count up of the first time period.

If the signal reception is started during counting for the second time period, the timer block 16 notifies the CPU 11 of the count up at the timing of the start of signal reception. On the other hand, if the signal reception is not started before the count up of the second time period, the timer block 16 notifies the CPU 11 of the count up at the timing of actual count up of the second time period.

The IC card control block 17 reads data from the IC card 18 via the control line 22, and also executes the IC card detection by detecting presence/absence of the IC card 18.

Figure 2:
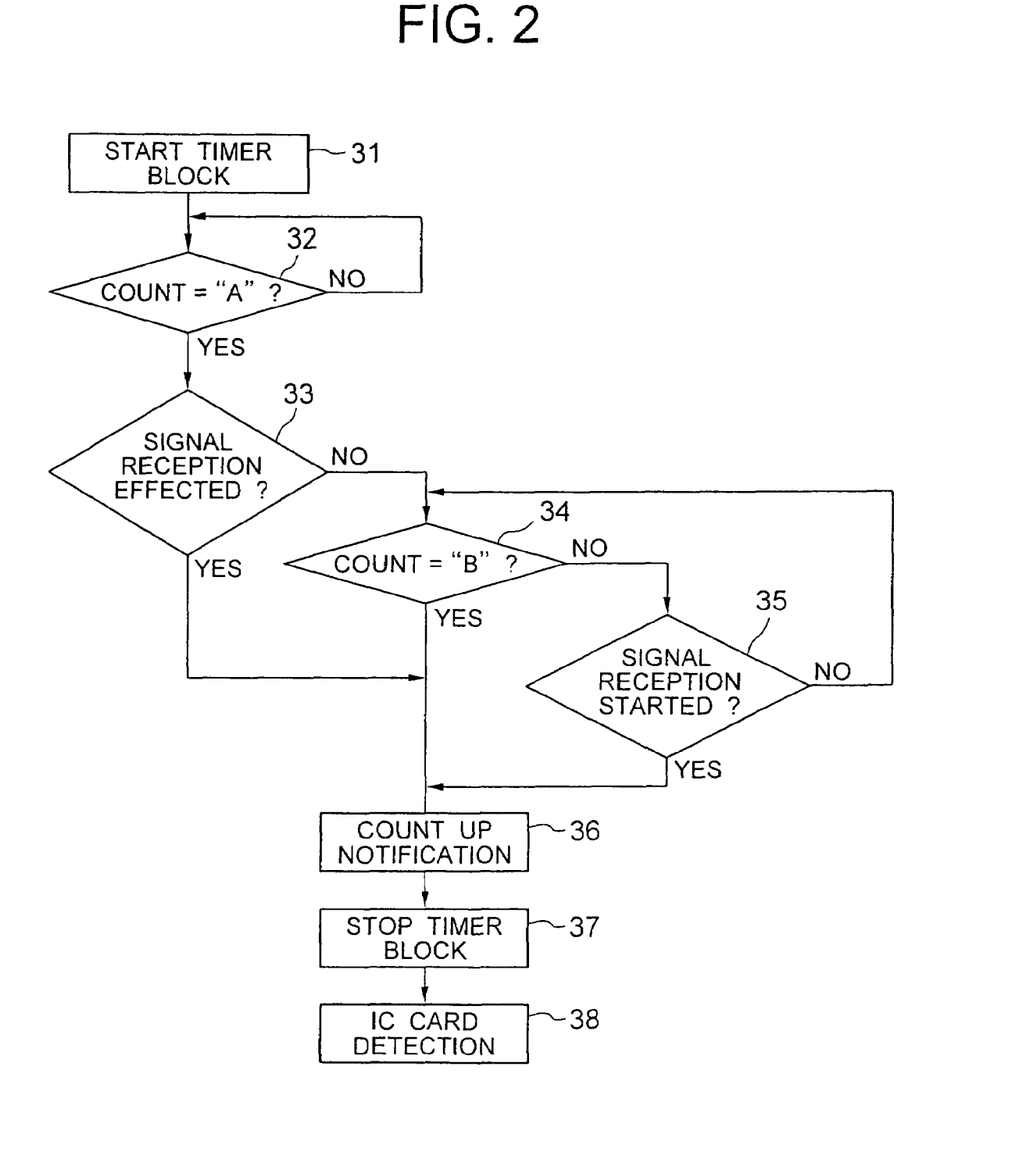
FIG. 2 is a flowchart showing the procedure of the mobile station of FIG. 1.

FIG. 2 shows the flowchart of procedure of the mobile station of FIG. 1. Before the start of procedure, the CPU 11 sets the first and second time periods on the timer block 16, wherein the setting (A) for the first time period is smaller than the setting (B) of the second time period. The timer block 16 starts for counting based on the clock supplied from the CPU 11 (step 31). If the count in the timer block 16 coincides with the setting A for the first time period (step 32), it is judged whether or not the signal reception is being effected (step 33).

The judgement is performed by the timer block 16 which examines the signal level of the control signal line 20 supplied from the intermittent reception control block 15.

If it is judged in step 33 that the signal reception is being effected, the process advances to step 36, wherein the timer block 16 notifies the CPU 11 of the count up via the interrupt request line 21. The CPU 11, after being notified of the count up, stops the timer block 16 from counting for the second time period for the IC card detection (step 37). Subsequently, the CPU 11 instructs the IC card control block 17 to detect the IC card 18 (step 38). The process then returns to step 31 to iterate the above procedure.

On the other hand, if it is judged in step 33 that the signal reception is not being effected, the process depends on the count in the timer block 16 counting for the second time period (step 34). More specifically, if it is judged in step 34 that the count in the timer block 16 is below the setting "B" for the second time period, the process advances to step 35 wherein it is also judged that the signal reception is started. If it is judged in step 35 that the signal reception is not started, the process returns to step 34, to iterate the steps 34 and 35 until the timer block 16 counts up for the second time period or until the signal reception is started.

If it is judged in step 34 before the start of the signal reception in step 35 that the timer block 16 counts up the second time period, the process advances to step 36 wherein the timer block 16 notifies the CPU 11 of the count up. On the other hand, if it is judged in step 35 before the count up in step 34 that the signal reception is started, the process also advances to step 36. The subsequent procedures in steps 37 and 38 are similar to those described above.

Figure 3:
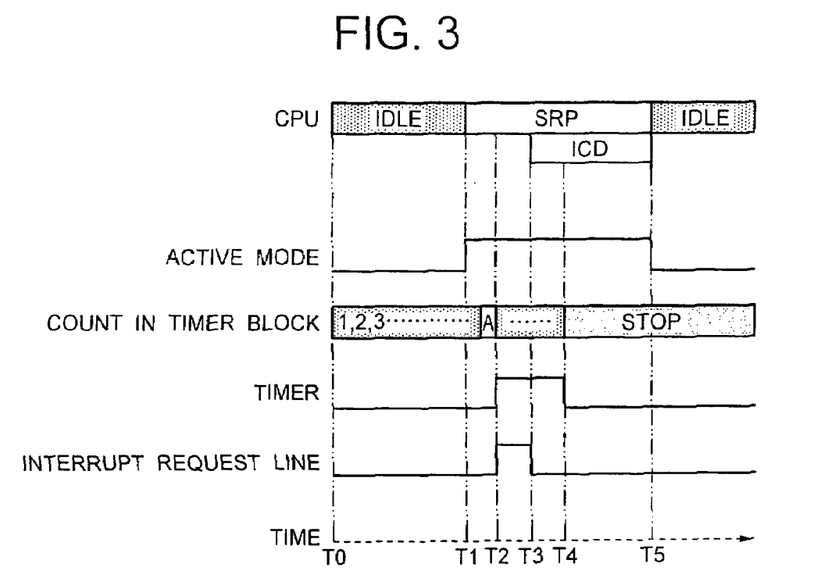
FIG. 3 is a timing chart in the case of count up of the first time period during operation for the intermittent signal reception in the mobile station of FIG. 1.

FIG. 3 shows a timing chart of the steps 31 to 33 and 36 to 38 in the case where the timer block 16 counts up the second time period "A" at the timing when the signal reception is being effected. T0 represents the time instant at which the timer block 16 starts for counting in step 31 at the end of the previous IC card detection. At time instant T1, the CPU 11 operates for signal reception processing (SRP) responding to the timing of the signal reception supplied from the intermittent reception control block 15. At time instant T2, the timer block 16 counts up the first time period "A" whereby the result of judgement in step 32 is "yes". In this case, since the signal reception is being effected at time instant T2, the result of judgement in step 33 is also "yes" and thus the procedure advances to step 36 wherein the timer block 16 notifies the CPU 11 of the count up via the interrupt request line 21. At time instant T3, the CPU 11 controls the IC card control block 17 to start for operation of detecting the IC card (ICD). At time instant T4, the CPU 11 stops the count by the timer block 16 in step 37. The CPU 11 finishes the IC card detection at time instant T5 in step 38, and then shifts to a sleep mode so long as the signal reception is also finished.

Figure 4:
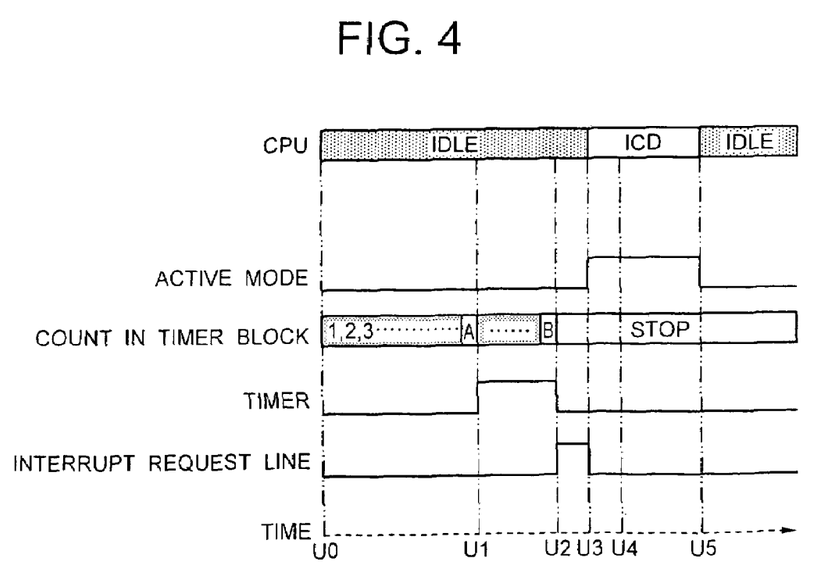
FIG. 4 is a timing chart of the mobile station of FIG. 1 in the case of count up of the second time period.

FIG. 4 shows a timing chart of the steps 31 to 34 and 36 to 38 in the case where the timer block 16 counts up the first time period "A" at the timing when the signal reception is not being effected and counts up the second time period "B" before the signal reception is started. U0 represents the time instant at which the timer block 16 starts for counting in step 31. The timer block 16 counts up the first time period "A" at time instant U1, at the timing when the signal reception is not being effected. The timer block 16 continues counting, and counts up the second time period "B" at time instant U2 without encounter of the signal reception. In this case, the timer block 16 notifies the CPU 11 of the count up at time instant U3 without any condition via the interrupt request line 21. The CPU 11 controls the IC card control block 17 to start for IC card detection. The CPU 11 then instructs the timer block 16 to stop for counting at time instant U4, although the timer block 16 is already stopped due to the count up thereof.

The CPU 11 finishes the IC card detection at time instant U5, and then stops for operation to thereby shift to a sleep mode.

Figure 5:
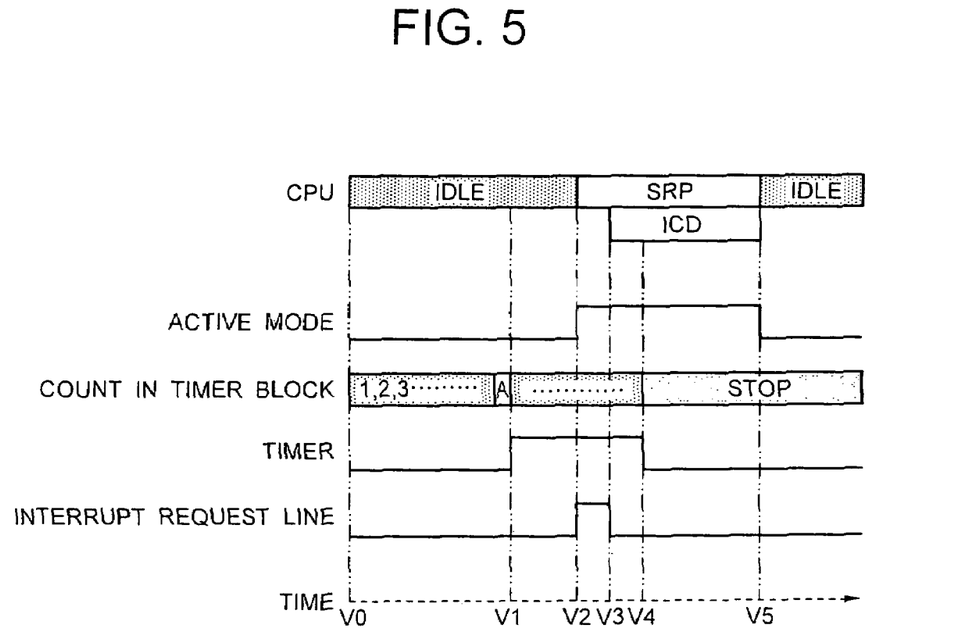
FIG. 5 is a timing chart of the mobile station of FIG. 1 in the case of occurring of the signal reception after the count up of the first time period.

FIG. 5 shows a timing chart of the steps 31 to 35 and 36 to 38 in the case where the timer block 16 counts up the first time period "A" when the signal reception is not being effected and where the signal reception is started before the timer block 16 counts up the second time period "B". V0 represents the time instant at which the timer block 16 starts for counting in step 31. The timer block 16 counts up the first time period "A" at time instant V1, at the timing when the signal reception is not being effected. The timer block 16 continues counting without notification of the count up. The intermittent reception control block 15 notifies the start of signal reception processing at time instant V2 via the control signal line 20. The CPU 11 operates for signal reception processing during the signal reception by the transceiver block 14 from the base station. The timer block 16, responding to the start of the signal reception, notifies the CPU 11 of the count up via the interrupt request line 21. The CPU 11 then controls the IC card control block 17 to start for IC card detection at time instant V3, and finishes the IC card detection at time instant V5. The CPU 11 then stops operation to thereby shift to a sleep mode so long as the signal reception is also finished.

In the above embodiment, a next IC card detection is not effected in any case before the counter block 16 counts up the first time period, which is counted from the end of the previous IC card detection. In addition, if a signal reception is being effected when the timer block 16 counts up the first time period, a next ID card detection is effected at the time of the count up. Moreover, if a signal reception is not being effected when the timer block 16 counts up the first time period, the next ID card detection is awaited until the timer block 16 counts up the second time period or a next signal reception is started. In the last case, if a signal reception is started before the timer block 16 counts up the second time period, the IC card detection is performed at the start of the signal reception. If a signal reception is not started before the timer block 16 counts up the second time period, the IC card detection is performed at the count up of the second time period without awaiting a next signal reception.

Figure 6:
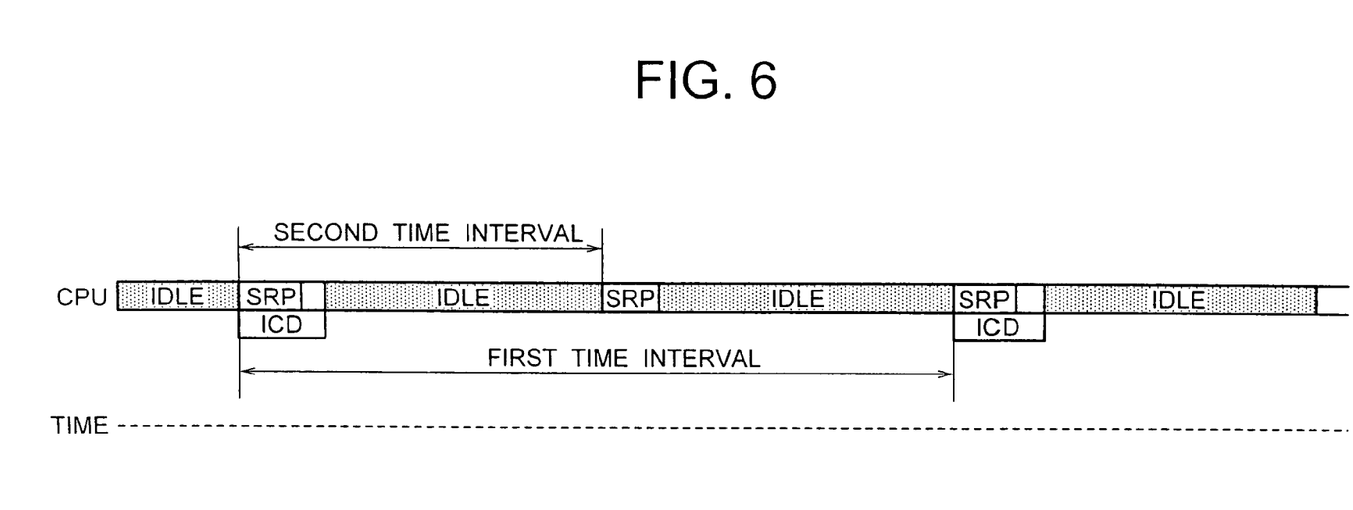
FIG. 6 is a timing chart of the mobile station of FIG. 1 in operation for the intermittent signal reception and IC card detection.

FIG. 6 shows an example of time chart of the CPU operating in accordance with the above embodiment. The first interval of the IC card detection (ICD) is generally larger than the second interval of the signal reception processing (SRP). For example, the signal reception continues for 20 to 100 milliseconds, and the interval of signal reception is few seconds depending on the mobile system and the location of the mobile station, whereas the IC card detection continues for 30 to 40 milliseconds, and the interval of IC card detection is around 30 seconds.

For example, if the IC card detection should be performed at an interval of not less than about 30 seconds, the first and second time intervals for the timer block may be determined at 20 and 30 seconds, respectively. In this case, if the signal reception is performed between the time instants of 20 seconds and 30 seconds from the end of the last IC card detection, the next IC card detection is performed substantially concurrently with the signal reception.

The substantially concurrent or synchronous operation of the periodic IC card detection and the intermittent signal reception provides reduction of the frequency of mode shift of the mobile station between the sleep mode and the active mode. This significantly reduces the power dissipation of the mobile station, especially due to reduction in the waiting time for stabilization of the clock signal.

It is to be noted that the control signal line 20 notifying the timer block 16 of the timing of the signal reception by the intermittent reception control block 15 may be replaced by another signal line, which indicates the operation of the CPU 11 for example.

In addition, although the above embodiment is such that the IC card detection is performed substantially concurrently with the signal reception of the mobile station, another signal processing may be performed substantially concurrently with the signal reception. More generally, a periodic signal processing which should be performed within a predetermined time period may be performed substantially concurrently with the intermittent signal processing which may be effected at a shorter time interval.

Since the above embodiments are described only for examples, the present invention is not limited to the above embodiments and various modifications or alterations can be easily made therefrom by those skilled in the art without departing from the scope of the present invention.

What is claimed is:

1. A mobile station comprising:
  a signal receiving block intermittently receiving a signal from a base station at a timing specified by said base station;
  a signal processing block periodically operating a specific task within a time interval;
  a timer block starting a time count at a specific timing to count up first and second time periods, wherein said timer block judges at a timing of a count up of said first time period whether said signal receiving block is receiving said signal, outputs a count up signal if said signal receiving block is receiving said signal, if said signal receiving block is not receiving said signal, said timer block continues said time count until one of said timer block counts up said second time period, and said receiving block starts for receiving said signal, and outputs a count up signal at a timing of a count up of said second time period without affecting said signal reception, or at a timing of said receiving block starting receiving of said signal without expiring said second time period; and
  a control block responding to said count up signal to control said signal processing block to operate said specific task, wherein said timer block starts for a time count at an end of operation of said signal processing block, said mobile station includes an IC card storing therein information of a subscriber, and said specific task of said signal processing block is to detect said IC card in said mobile station.

2. A method comprising the steps of:
  starting a time count at a specific timing to count up first and second time periods;
  judging at a timing of a count up of a first time period whether a signal reception is effected;
  if said signal reception is effected, outputting a count up signal;
  if said signal reception is not effected, continuing said time count until one of said second time period expires, and a signal reception is started, and
    if said second time period expires without affecting said signal reception, outputting the count up signal at a timing of a count up of said second time period, and
    if said signal reception is started without expiring said second time period, outputting the count up signal at a timing of starting of said signal reception; and
    responding to said count up signal to operate a specific task, wherein said specific timing to count up the second time period starts at an end of operation of said specific task, and said specific task is an IC card detection.

* * * * *